US007548766B2

(12) United States Patent
Takahata et al.

(10) Patent No.: US 7,548,766 B2
(45) Date of Patent: Jun. 16, 2009

(54) FLAT TYPE SPEAKER UNIT, AND ELECTRONIC APPLIANCE HAVING THIS UNIT

(75) Inventors: Yuki Takahata, Daito (JP); Minoru Kumita, Higashiosaka (JP); Takashi Marugami, Ibaraki (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 96 days.

(21) Appl. No.: 10/553,624

(22) PCT Filed: Apr. 22, 2004

(86) PCT No.: PCT/JP2004/005825

§ 371 (c)(1), (2), (4) Date: Oct. 19, 2005

(87) PCT Pub. No.: WO2004/098231

PCT Pub. Date: Nov. 11, 2004

(65) Prior Publication Data

US 2006/0210099 A1 Sep. 21, 2006

(30) Foreign Application Priority Data

| | | | |
|---|---|---|---|
| Apr. 25, 2003 | (JP) | ............................ | 2003-122640 |
| Jun. 17, 2003 | (JP) | ............................ | 2003-172234 |
| Sep. 2, 2003 | (JP) | ............................ | 2003-309648 |
| Oct. 20, 2003 | (JP) | ............................ | 2003-358620 |

(51) Int. Cl.
*H04M 1/00* (2006.01)

(52) U.S. Cl. ............................ 455/569.1; 379/433.02; 181/172; 381/388

(58) Field of Classification Search ............. 455/550.1, 455/566, 575.1, 569.1; 181/171, 172, 157; 379/433.02; 381/388, 386, 333
See application file for complete search history.

(56) References Cited

U.S. PATENT DOCUMENTS

| | | | | |
|---|---|---|---|---|
| 5,764,784 | A * | 6/1998 | Sato et al. ................... | 381/412 |
| 6,289,101 | B1 * | 9/2001 | Wei et al. ............... | 379/433.13 |
| 6,342,831 | B1 | 1/2002 | Azima | |

(Continued)

FOREIGN PATENT DOCUMENTS

| | | |
|---|---|---|
| JP | 8-140185 | 5/1996 |

(Continued)

OTHER PUBLICATIONS

Office Action dated Sep. 2, 2008 "Notice of Reason for Refusal".

*Primary Examiner*—Edward Urban
*Assistant Examiner*—Christian A Hannon
(74) *Attorney, Agent, or Firm*—Kratz, Quintos & Hanson, LLP

(57) ABSTRACT

A flat panel speaker unit includes, within a frame (1), a transparent diaphragm (2) for outputting sound, a vibration generating part (4) for vibrating the diaphragm (2); and a display device (3) disposed inward of the diaphragm (2), for displaying information. The diaphragm (2) and the display device (3) are stacked with a gap therebetween so that an image on the display device (3) can be viewed through the diaphragm (2). The diaphragm (2) is fixed to the frame (1) by mounting a peripheral portion of the diaphragm (2) on to the frame (1).

4 Claims, 8 Drawing Sheets

U.S. PATENT DOCUMENTS

| | | | | |
|---|---|---|---|---|
| 6,421,449 | B1 * | 7/2002 | Hasegawa et al. | 381/401 |
| 6,427,017 | B1 * | 7/2002 | Toki | 381/190 |
| 6,522,760 | B2 * | 2/2003 | Azima et al. | 381/152 |
| 6,760,455 | B2 * | 7/2004 | Croft et al. | 381/191 |
| 6,791,519 | B2 * | 9/2004 | Aarts et al. | 345/87 |
| 6,940,564 | B2 * | 9/2005 | Murden et al. | 349/1 |
| 7,020,302 | B2 * | 3/2006 | Konishi et al. | 381/424 |
| 7,039,206 | B2 * | 5/2006 | Mellow | 381/190 |
| 7,120,264 | B2 * | 10/2006 | Saiki et al. | 381/184 |
| 7,151,837 | B2 * | 12/2006 | Bank et al. | 381/190 |
| 2002/0034313 | A1 * | 3/2002 | Lin et al. | 381/333 |
| 2002/0118847 | A1 | 8/2002 | Kam | |
| 2003/0003879 | A1 * | 1/2003 | Saiki et al. | 455/90 |

FOREIGN PATENT DOCUMENTS

| | | |
|---|---|---|
| JP | 2002-252895 | 9/2002 |
| JP | 2002-533957 | 10/2002 |
| JP | 2003-18686 | 1/2003 |

* cited by examiner

FLAT TYPE SPEAKER UNIT, AND ELECTRONIC APPLIANCE HAVING THIS UNIT

BACKGROUND OF THE INVENTION

1. Field of the Invention

The present invention relates to flat panel speaker units and electronic devices, such as mobile telephones, provided with the flat panel speaker units.

2. Description of Related Art

A known flat panel speaker that is arranged in front of a display device for mobile telephones or the like has the following configuration. FIG. 15 is a perspective view illustrating the conventional flat panel speaker, arranged in front of a display device, FIG. 16 is a cross-sectional view of the flat panel speaker, taken along line B-B in FIG. 15, and FIG. 17 is an enlarged view illustrating a portion C in FIG. 16 (cf. Japanese Utility Model No. 3078022).

The conventional flat panel speaker is furnished with a transparent diaphragm 2 and vibration generating parts 4 for vibrating the diaphragm 2, each provided corresponding to one end of the diaphragm 2. Each of the vibration generating parts 4 comprises a magnet unit 41 and a coil 40 provided on the diaphragm 2. The magnet unit 41 comprises a case 44, a yoke 43, and a magnet 42 covered by the yoke 43.

By passing an electric signal based on an audio signal through the coil 40, magnetic flux is produced from the coil 40. The magnetic flux interacts with the magnetic field of the magnets 42, 42, causing the diaphragm 2 to vibrate up and down. This causes the diaphragm 2 to output sound.

The above-described flat panel speaker is configured such that the transparent diaphragm 2 is mounted on a chassis 8 of the electric device, such as a mobile telephone, through a cushioning material 19, and that a display device 3, which is a liquid crystal panel, is provided below the diaphragm 2. The chassis 8 has a window 18 facing the diaphragm 2 and the display device 3. Thus, the user can view the image on the display device 3 through the diaphragm 2.

The conventional flat panel speaker, however, has the following problems to be resolved.

1. Currently, electric devices such as mobile telephones are required to have a thinner chassis 8. Accordingly, it is preferable that the gap between the diaphragm 2 and the display device 3 be narrowed. In the conventional electric devices, however, the flat panel speaker and the display device 3 are separately mounted in the chassis 8. This makes it difficult to control the vertical gap between the diaphragm 2 and the display device 3 in the manufacturing process of the electric device, leading to such drawbacks as that the diaphragm 2 and the display device 3 come into contact with each other.

2. Having to be arranged in front of the display device, the diaphragm 2 has a flat central portion so that the image viewed through the diaphragm 2 does not deform. For this reason, the central portion of the diaphragm 2 is weak in strength. Moreover, the diaphragm 2 is uncovered in the conventional display device and is therefore susceptible to breakage caused by pressure or impact from the outside. If the diaphragm 2 is made thicker, the diaphragm 2 will have an increased strength against pressure and impact but will become difficult to vibrate, resulting in poorer sound quality.

3. According to the conventional configuration shown in FIG. 17, the coil 40 is arranged in a gap between the yoke 43 and the magnet 42. This means that the size of the coil 40 cannot be larger than the gap, which risks the vibration of the coil 40 not passing sufficiently into the diaphragm 2. Moreover, there is also a concern that the yoke 43 and the coil 40, or the coil 40 and the magnet 42, scrape on each other in manufacturing the flat panel speaker.

BRIEF SUMMARY OF THE INVENTION

It is an object of the present invention to resolve the foregoing problems.

A flat panel speaker unit comprises, within a frame 1, a transparent diaphragm 2 for emitting sound, vibration generating parts 4 for vibrating the diaphragm 2, and a display device 3, positioned inward of the diaphragm 2, for displaying information. The diaphragm 2 overlays the display device 3 with a gap provided therebetween so that an image on the display device 3 may be viewed through the diaphragm 2; and the diaphragm 2 is fixed to the frame 1 by mounting the peripheral portion of the diaphragm 2 to the frame 1.

The vibration generating part 4 includes a coil 40 and a magnet 42, one of the coil 40 or the magnet 42 being arranged at the peripheral portion of the diaphragm 2, and the peripheral portion of the diaphragm 2 is made thinner than the central portion.

The coil 40 is coiled more laterally than vertically, and causes the diaphragm 2 to vibrate by receiving, among the magnetic flux lines emitted from the magnet 42, magnetic lines that are diagonal or parallel with respect to the diaphragm 2.

DETAILED DESCRIPTION OF THE PREFERRED EMBODIMENTS

Hereinbelow, embodiments of the present invention are detailed with reference to the drawings.

First Embodiment

Overall Configuration

Hereinbelow, one embodiment of the present invention is detailed with reference to the drawings.

Figure 1:
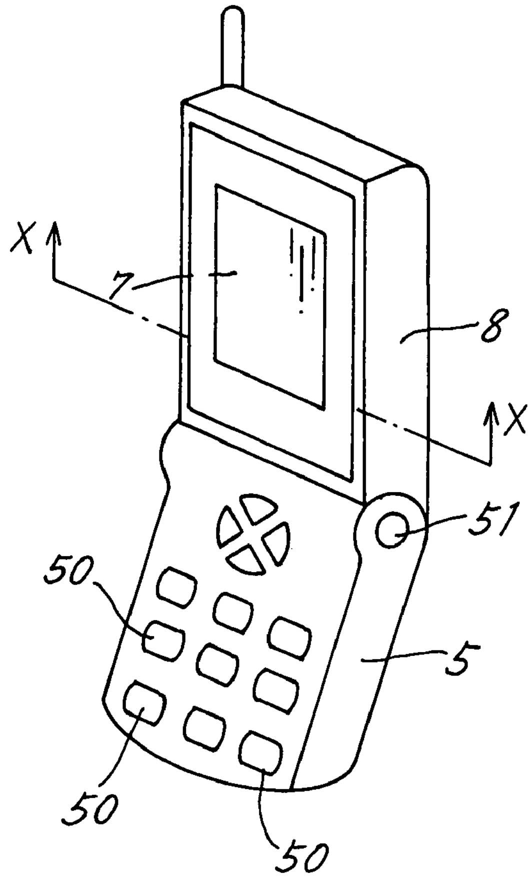
FIG. 1 is a perspective view of a mobile telephone unit.
Figure 2:
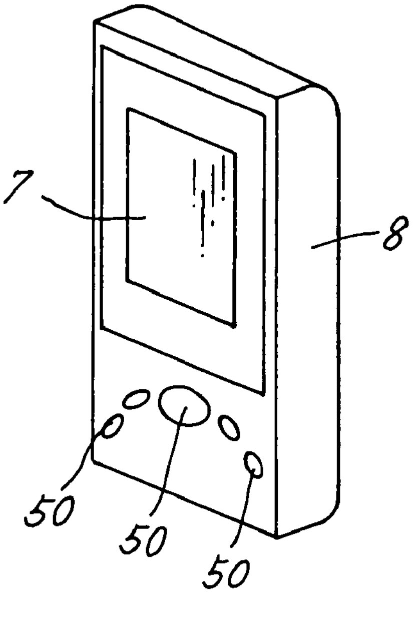
FIG. 2 is a perspective view of a PDA.

FIGS. 1 and 2 are perspective views illustrating an electric device adopting a flat panel speaker unit 7 according to the present embodiment, in which FIG. 1 shows a mobile telephone unit and FIG. 2 shows a PDA (personal digital assistant). The mobile telephone unit shown in FIG. 1 has a flat panel speaker unit 7 accommodated in a chassis 8. The chassis 8 is connected to an auxiliary chassis 5 having a plurality of operation buttons 50 by a hinge 51, and sound propagates from a flat panel speaker unit 7. The PDA shown in FIG. 2 is furnished with operation buttons 50, 50 in a chassis 8 that accommodates a flat panel speaker unit 7, from which the sound produced from an accessed web site propagates.

Configuration of the Flat Panel Speaker Unit

Figure 3:
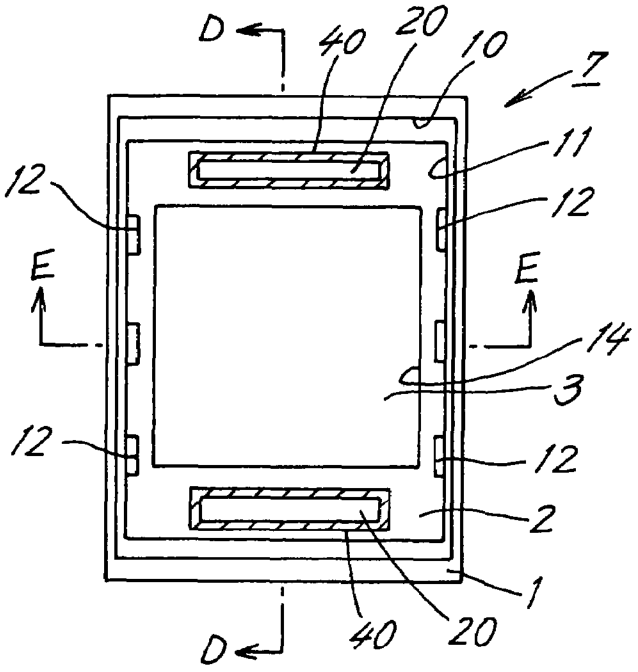
FIG. 3 is a front view of a flat panel speaker unit.
Figure 4:
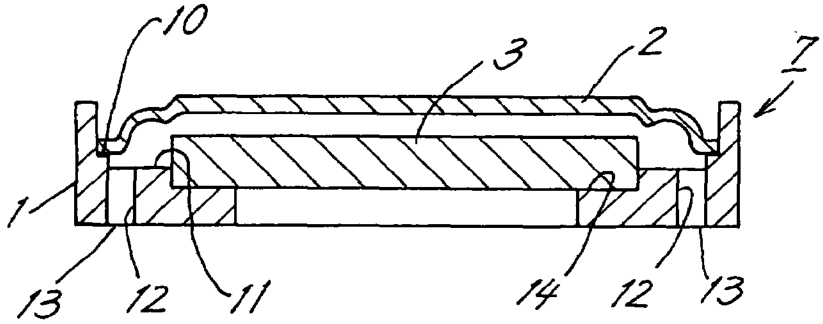
FIG. 4 is a cross-sectional view taken along line E-E in FIG. 3.
Figure 5:
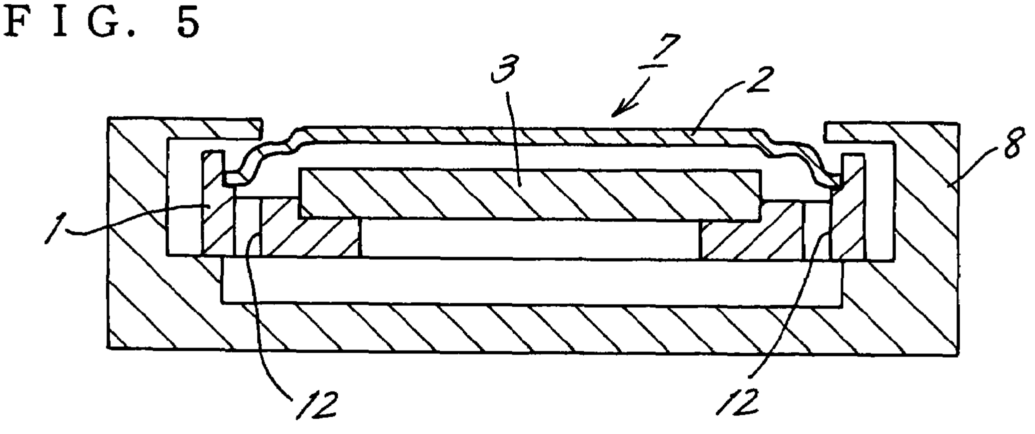
FIG. 5 is a cross-sectional view taken along line X-X in FIG. 1.

FIG. 3 is a front view of the flat panel speaker unit 7, and FIG. 4 is a cross-sectional view taken along line E-E in FIG. 3. FIG. 5 is a cross-sectional view taken along line X-X in FIG. 1. The flat panel speaker unit 7 is constructed by overlaying, within a frame 1, a display device 3 for producing an image and a transparent diaphragm 2 for outputting sound. The frame 1 is formed of a synthetic insulative resin to meet demands for weight reduction.

A first stepped surface 10 in a rectangular form is provided in the frame 1, and the display device 3 and the diaphragm 2 are placed within the first stepped surface 10. The diaphragm 2 is formed of a transparent optical film. Specifically, the diaphragm 2 is formed of a material such as polyethylene terephthalate (PET), polycarbonate (PC), polyethylene naphthalate (PEN), polyetherimide (PEI), and polyimide (PI).

The top surface of the frame 1 and the central portion of the diaphragm 2 are positioned in substantially the same plane. The peripheral portion of the diaphragm 2 forms a bent so that its outer peripheral edge comes into contact with the peripheral edge of the first stepped surface 10. The peripheral portion of the diaphragm 2 is placed on the peripheral portion of the first stepped surface 10 and is attached thereto with adhesive or the like.

A second stepped surface 11 is provided inward of the first stepped surface 10 within the frame 1, and the display device 3, which is a liquid crystal panel, is fitted into a mounting hole 14 formed in the second stepped surface 11.

In the second stepped surface 11 that is outside of the display device 3, sound release holes 12, 12 that have openings 13 on the lower face are provided along the longer sides of the second stepped surface 11 so that the air within the frame 1 comes in and goes out through the sound release holes 12, 12 when the diaphragm 2 vibrates.

On the second stepped surface 11 that is outside the display device 3, coils 40, 40 coiled around in a rectangular form extend along the shorter sides of the second stepped surface 11. The coils 40, 40 are placed so that the display device 3 is interposed therebetween. That is, the coils 40, 40 are provided corresponding to opposing sides of the diaphragm 2, by which the diaphragm 2 vibrates in such a manner that both ends thereof vibrate at the same amplitude. Each of the coils 40 fits onto a locating nub 20 protruding downwardly from the diaphragm 2. Since the coils 40 fit onto the locating nubs 20, the mounting positions of the coils 40 do not vary.

Figure 6:
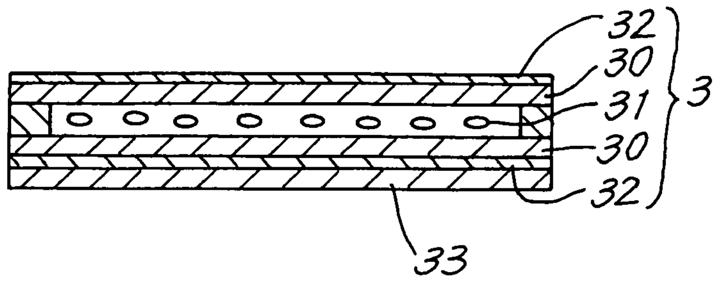
FIG. 6 is a cross-sectional view of a liquid crystal panel.

The display device 3 is, as mentioned above, a liquid crystal panel, in which liquid crystal 31 is filled between a pair of glass substrates 30, 30 and polarizing plates 32 are attached onto the outer surfaces of the substrates 30, as illustrated in the cross-sectional view of FIG. 6. The lower substrate 30 is opposed to a backlight 33. When a current is passed through transparent electrodes (not shown) attached onto the inner surfaces of the substrates 30, the alignment of the liquid crystal 31 changes so as to transmit the light from the backlight 33. As is well known, an image is displayed by switching the transparent electrodes on and off.

Figure 7:
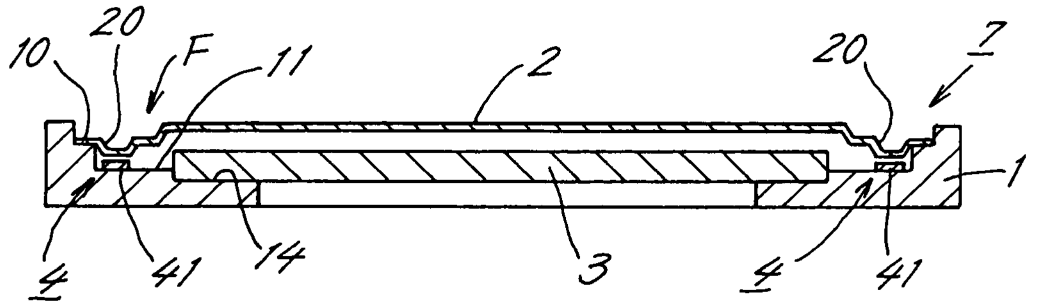
FIG. 7 is a cross-sectional view taken along line D-D in FIG. 3.
Figure 8:
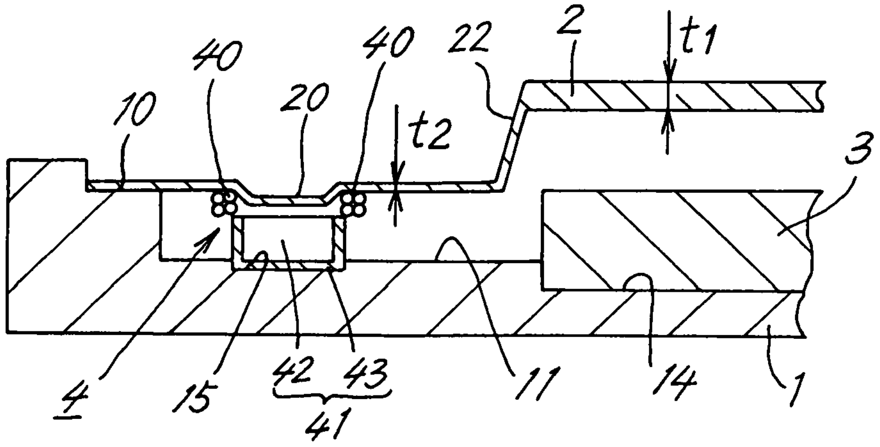
FIG. 8 is a enlarged view of a portion F in FIG. 7.

FIG. 7 is a cross-sectional view taken along line D-D in FIG. 3, and FIG. 8 is an enlarged view of a portion F in FIG. 7. A magnet unit 41 is provided on a peripheral portion of the second stepped surface 11, and the locating nub 20 is provided opposing the magnet unit 41. The coil 40 and the magnet unit 41 form a vibration generating part 4 for vibrating the diaphragm 2.

As illustrated in FIG. 8, the magnet unit 41 is constructed by covering the circumferential face and the bottom face of the magnet 42 with a yoke 43. The magnet unit 41 fits into a positioning recess 15 provided in the second stepped surface 11. This prevents the mooting position of the magnet unit 41 from varying.

The diaphragm 2 has a step portion 22 at the boundary between its central portion and its peripheral portion to enhance the strength and reduce the flat area of the central portion. The display device 3 is placed inward of the step portion 22, effectively utilizing the inner space of the step portion 22.

The diaphragm 2 is formed so that the peripheral portion thickness t2 is thinner than the central portion thickness t1. Since the coils 40 are provided on the peripheral portion of the diaphragm 2, the peripheral portion of the diaphragm 2 tends to vibrate easily. In this case, it may be conceivable to reduce the thickness of the entire diaphragm 2; however, this undesirably causes the diaphragm 2 to vibrate easily and it is even possible to produce unnecessary sound. Moreover, if the entire diaphragm 2 is made thin, the diaphragm 2 becomes susceptible to deform when the user inadvertently presses the diaphragm 2 with the hand. In view of this, the peripheral portion thickness t2 is made thinner than the central portion thickness t1 to prevent the generation of unnecessary sound and the deformation of the diaphragm 2. Specifically, the peripheral portion thickness t2 of the diaphragm 2 may be 20 μm to 75 μm, and the central portion thickness t1 may be 100 μm to 150 μm. These thicknesses are not limiting, but it is preferable that the ratio of the central portion thickness t1 to the peripheral portion thickness t2 be 1.5:1 to 3:1. If the central portion is thinner than this range, the strength will not increase and moreover sound quality will degrade. On the other hand, if the central portion is thicker than this range, the diaphragm is difficult to vibrate, degrading sound pressure.

Figure 9:
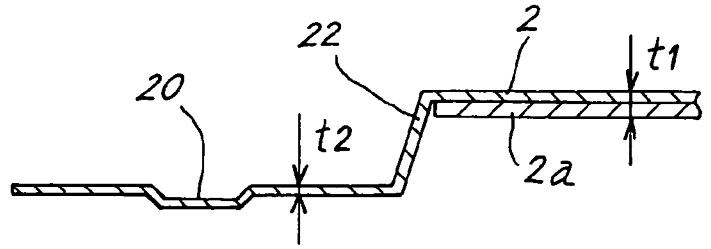
FIG. 9 is a cross-sectional view of another diaphragm.

Alternatively, as illustrated in FIG. 9, the diaphragm 2 may be formed so as to have a uniform thickness, and a reinforcing plate 2*a* may be attached onto the central portion of the diaphragm 2 so that the central portion of the diaphragm 2 becomes thicker than the peripheral portion.

Vibration Generating Part

Figure 10:
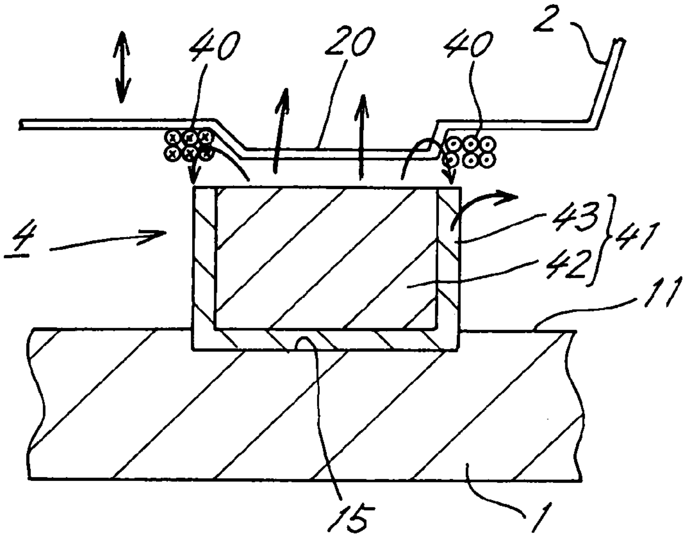
FIG. 10 is a cross-sectional view illustrating a positional relationship of a magnet unit and a coil.

As shown enlarged in FIG. 10, the magnetic flux that comes out directly upward from the magnet unit 41 merely passes through the locating nub 20 of the diaphragm 2 and does not cause the diaphragm 2 to vibrate.

On the other hand, the magnetic flux that comes out diagonally upward from the magnet unit 41 and the magnetic flux that comes out parallel to the diaphragm 2 passes through the coil 40. In other words, the magnetic flux is absorbed by the yoke 43 and easily passes through the coil 40, which is positioned near the yoke 43. When an alternating current is passed through the coil 40 (the current flows on the right of the coil 40, from the back of the sheet toward the front of the sheet in FIG. 10), the coil 40 vibrates up and down according to the Fleming's rule. The diaphragm 2, on which the coil 40 is mounted, accordingly vibrates, thereby emitting sound. As mentioned previously, the image on the display device 3 can be viewed through the diaphragm 2. Since the display device 3 and the diaphragm 2, which produces sound, are opposed to each other and placed, the use can obtain images and sound that are natural and realistic.

It should be noted that the coil 40 is coiled so that the number of coils is larger in the lateral direction than in the vertical direction. This increases the contact area between the diaphragm 2 and the coil 40, permitting the vibration of the coil 40 to easily propagate to the diaphragm 2. Therefore, sound pressure and sound quality can be improved. Moreover, the use of the coil 40 that extends horizontally also prevents the coil 40 and the magnet 42 from coming into contact with each other.

Figure 11:
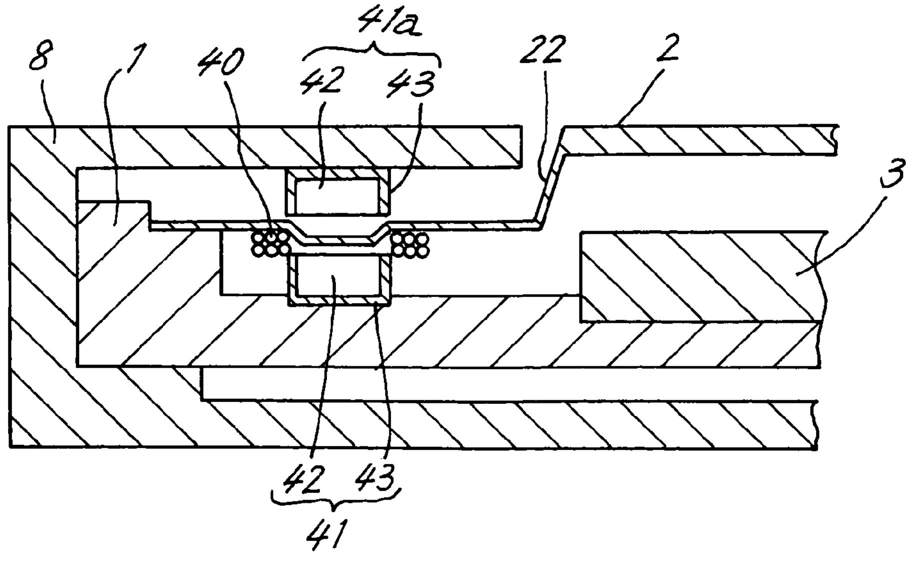
FIG. 11 is a cross-sectional view illustrating another positional relationship of the magnet unit and the coil.

Alternatively, as illustrated in FIG. 11, a second magnet unit 41*a* that attracts the magnet unit 41 may be disposed above the magnet unit 41 so that the coil 40 is sandwiched between the magnet units 41 and 41*a*. This configuration increases the magnetic flux that is diagonal or parallel with respect to the diaphragm 2, further improving sound pressure and sound quality.

Figure 12:
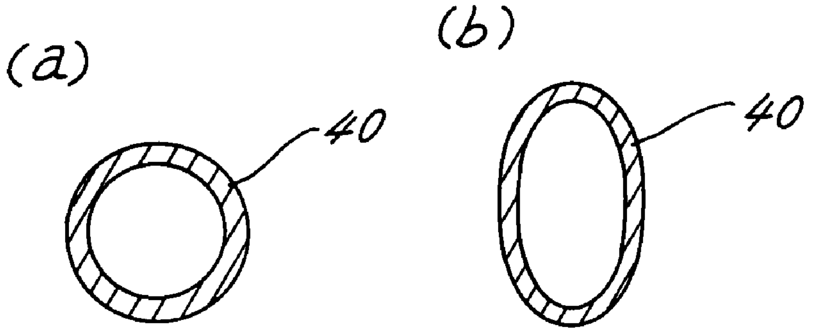
FIG. 12 is a plan view illustrating another coil.

Furthermore, although the coil 40 is illustrated as being coiled in a rectangular form, it may be coiled in a circular or elliptical form, as illustrated in FIGS. 12(*a*) and 12(*b*).

Second Embodiment

In the foregoing embodiment, the perimeter of the diaphragm 2 is fixed to the frame 1. With this configuration, however, no gap is provided between the diaphragm 2 and the frame 1 and therefore an electric wire for passing current through the display device 3 and the coil 40 cannot be taken out from the surface of the diaphragm 2.

Figure 13:
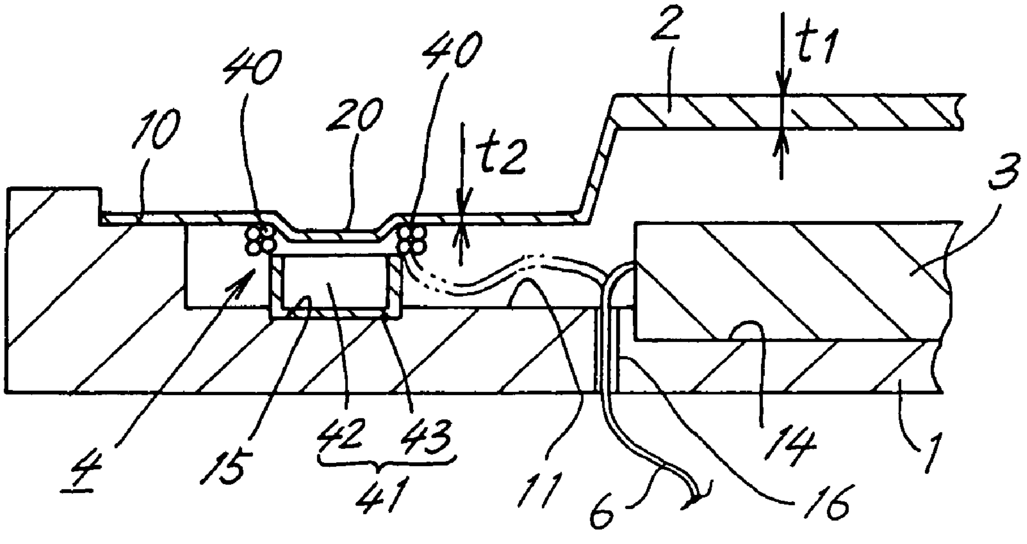
FIG. 13 is a cross-sectional view illustrating a flat panel speaker unit of another embodiment.

In the present embodiment, a through hole 16 is provided in the second stepped surface 11 between the display device 3 and the vibration generating part 4, as illustrated in FIG. 13. An electric wire or a flexible circuit board 6 for supplying power is connected to the display device 3, and the electric wire or the flexible circuit board 6 extends out of the frame 1 through the through hole 16

The flexible circuit board 6 is called a flexible PCB, which is formed by sandwiching a thin film electrode between sheets. The electric wire or the flexible circuit board 6 may be divided into one for supplying power to the substrates 30, 30 and one for supplying power to a backlight 33, or may be formed unitarily. In addition, the electric wire or the flexible circuit board 6 may be connected to the coil 40 of the vibration generating part 4, as indicated by the dash-dotted line in FIG. 13.

By taking out the electric wire or the flexible circuit board 6 from the through hole 16, the electric wire or flexible circuit board 6 may be taken out of the frame 1 without making contact with the display device 3 or the vibration generating part 4.

It may be conceivable to take out the electric wire through a through hole (not shown) formed in a side face of the frame 1. However, this requires a longer electric wire than is used when taking it out from the lower side of the frame 1 in the manner as described above, causing an increase in cost and an in resistance of the wire. Moreover, since the chassis 8 in which the flat panel speaker unit 7 is arranged is often held by one hand, it is undesirable to increase the width of the chassis 8. From this respect too, the electric wire or flexible circuit board 6 should not be taken out from a side face of the chassis 8. Furthermore, because the vibration generating part 4 is arranged opposing a shorter side of the frame 1, the electric wire or the flexible circuit board 6 may make contact with the coil 40 or the magnet 42 of the vibration generating part 4 when the electric wire or the flexible circuit board 6 is taken out from a side face of the chassis 8. To prevent this, it is necessary to widen the gap between the coil 40 and the magnet 42, which increases the thickness of the flat panel speaker unit 7 and moreover degrades its acoustic performance. For these reasons, the electric wire or the flexible circuit board 6 is taken out from the lower face of the frame 1.

OTHER APPLICATIONS

The sound release hole 12 is described in the foregoing embodiments as having the opening 13 in the lower face, the opening 13 may be covered with a mesh sheet (not shown) to provide a dustproof or water-repellent effect.

Figure 14:
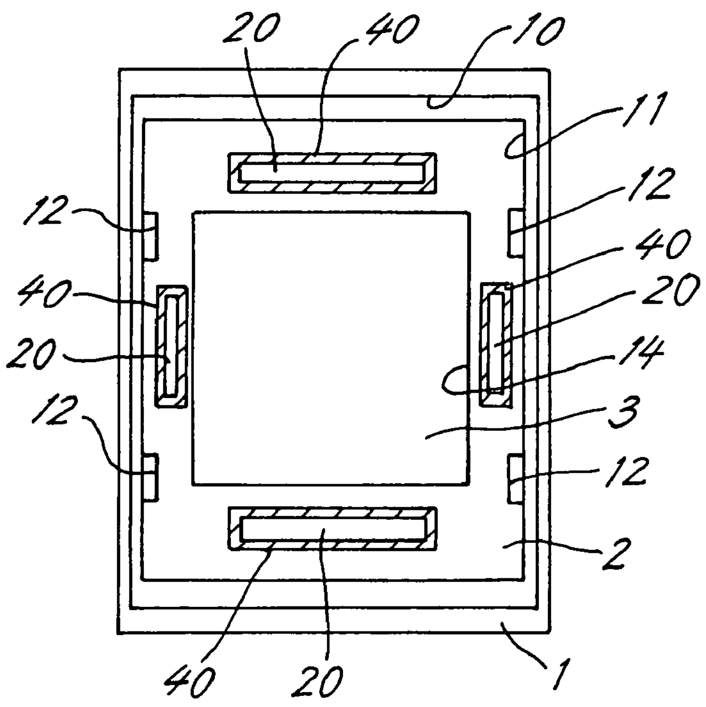
FIG. 14 is a plan view of the flat panel speaker unit of the other embodiment.
Figure 15:
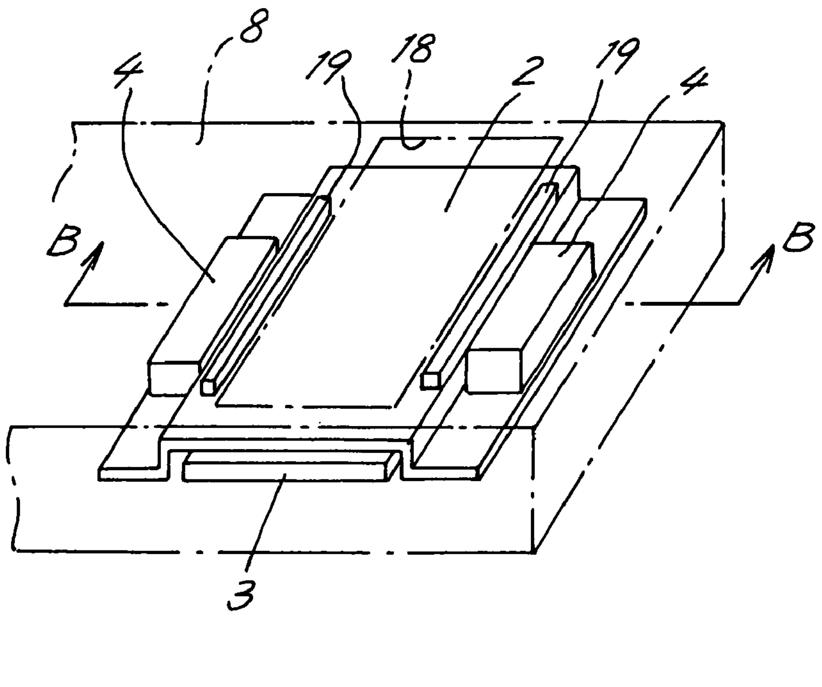
FIG. 15 is a perspective view illustrating a conventional flat panel speaker arranged in front of a display device.
Figure 16:
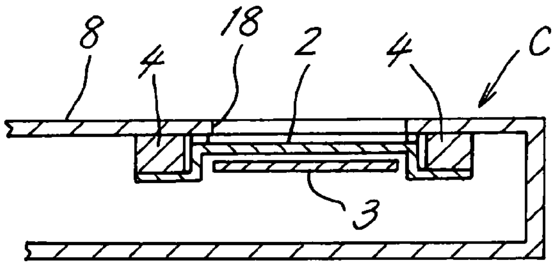
FIG. 16 is a cross-sectional view of the flat panel speaker, taken along line B-B in FIG. 15.
Figure 17:
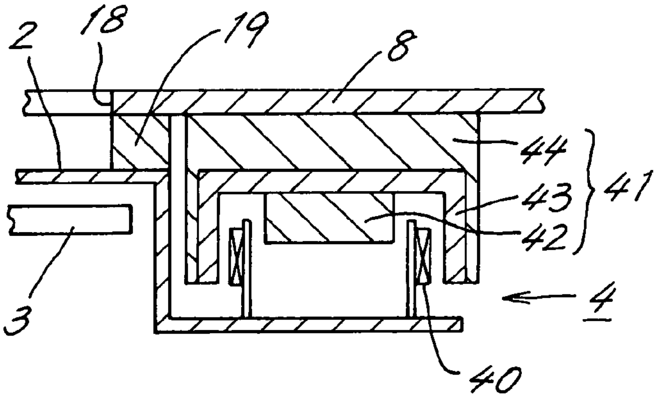
FIG. 17 is an enlarged view illustrating a portion C in FIG. 16.

Moreover, although two coils 40 are depicted on the second stepped surface 11, four coils may be provided each opposing each edge of the display device 3, as illustrated in FIG. 14.

Figure 18:
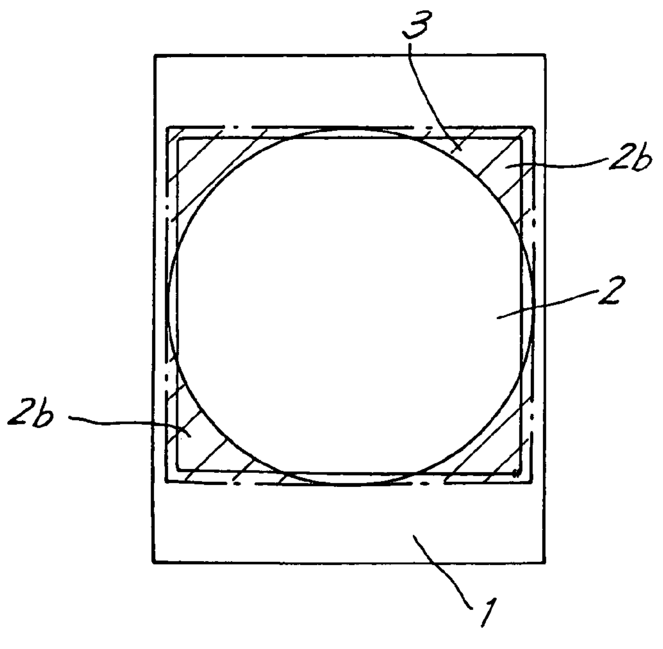
FIG. 18 is a front view of a flat panel speaker unit, illustrating an undesirable example.

A speaker is usually in a circular shape. However, if the diaphragm 2 is formed in a circular shape and overlaid on the display device 3, wasted portions 2*b*, as indicated by the hatched area in FIG. 18, form, in which there is no diaphragm and that does not output sound. According to the present embodiments, since the diaphragm 2 is formed in a rectangular shape, such wasted portions 2*b* are not formed and the diaphragm 2 is made large; therefore, it easily produces bass, improving sound quality.

Although in the foregoing embodiments the coil 40 is provided on the diaphragm 2 and the magnet unit 41 is arranged in the second stepped surface 11, it is possible to arrange the magnet unit 41 on the diaphragm 2 and place the coil 40 in the second stepped surface 11.

Furthermore, although the diaphragm 2 is described as being attached to the peripheral portion of the first stepped surface 10 with adhesive or the like, the diaphragm 2 may be attached to the peripheral portion of the first stepped surface 10 with a pressure member (not shown).

Figure 19:
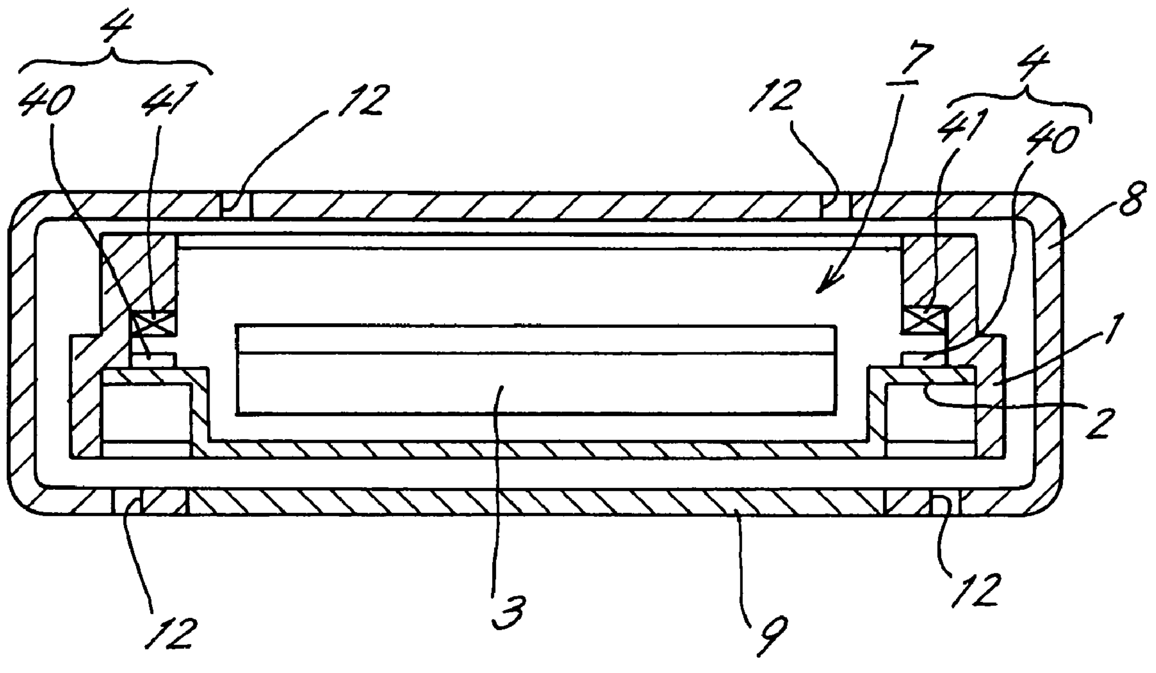
FIG. 19 is a cross-sectional view illustrating a flat panel speaker unit and its chassis according to another embodiment.

In the foregoing embodiments, the diaphragm 2 is exposed from the opening of the chassis 8. However, a protection panel 9 arranged overlaying the diaphragm 2, as illustrated in FIG. 19, may be provided on the chassis 8. In this case, the sound release holes 12 may be formed in the protection panel 9 or in the chassis 8 that is around the protection panel 9.

Furthermore, although a liquid crystal panel has been illustrated as an example of the display device 3, an organic electroluminescent display or an inorganic electroluminescent display may be adopted in place. The electroluminescent display has a known configuration in which a light-emitting substance is vapor deposited on a glass substrate. The organic electroluminescent display uses an organic substance such as diamine as the light-emitting substance, while the inorganic electroluminescent display uses an inorganic substance, such as zinc sulfide, as the light-emitting substance. The use of the electroluminescent display as the display device 3 can eliminate the backlight 33.

Although in the foregoing embodiments the flat panel speaker unit is applied to the mobile telephone unit and the PDA, the flat panel speaker unit may be used for a digital camera, a digital video recorder, or a display plate for use in art museums, zoos, and the like.

INDUSTRIAL APPLICABILITY

1. Since the peripheral portion of the diaphragm 2 is placed on the frame 1, the height position of the diaphragm 2 shows little variation. Because both the diaphragm 2 and the display device 3 are secured to the frame 1 with being overlaid with each other, it is possible to position the gap between the diaphragm 2 and the display device 3 highly accurately, preventing the diaphragm 2 and the display device 3 from coming into contact with each other. Consequently, the distance between the diaphragm 2 and the display device 3 can be minimized, and the thickness of the chassis 8 of the electric device reduced.

In particular, it is unnecessary to control the vertical gap between the diaphragm 2 and the display device 3 in the manufacturing process for assembling the flat panel speaker unit into the electric device by the manufacturer, resulting in good workability.

2. The peripheral portion thickness t2 of the diaphragm 2 is made thinner than the central portion thickness t1. Since the coils 40 are provided in the peripheral portion of the diaphragm 2, the peripheral portion of the diaphragm 2 vibrates more easily. If the entire diaphragm 2 is thin, the diaphragm 2 may vibrate reversely easily and thereby produce undesired sound. Moreover, the diaphragm 2 may deform by accident. In view of these problems, the peripheral portion thickness t2 of the diaphragm 2 is made thinner than the central portion thickness t1 in order to prevent production of undesired sound and deformation of the diaphragm 2.

3. The coils 40 are coiled a greater number of times in a lateral direction than in a vertical direction. This increases the contact area between the diaphragm 2 and the coils 40, making the vibration of the coils 40 propagate to the diaphragm 2 more easily. Therefore, sound pressure and sound quality are improved. The use of the coils 40 extending in a horizontal direction can also prevent the coil 40 and the magnet 42 from coming into contact with each other.

4. The electric wire or flexible circuit board 6 is taken out from the through hole 16 formed in the lower face of the frame 1. The electric wire or the flexible circuit board 6 can be taken out of the frame 1 without making contact with the display device 3 or the vibration generating part 4.

Moreover, the length of the electric wire or flexible circuit board 6 may be shorter than when the electric wire or flexible circuit board 6 is taken out from a side of the frame 1.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. A flat panel speaker unit comprising, within a frame:

a transparent single diaphragm for outputting sound; and a vibration generating part including a coil and a magnet, for vibrating the diaphragm;

a display device disposed inward of the diaphragm for displaying information;

either one of the coil and magnet is mounted on a peripheral portion of the diaphragm, a central portion of the diaphragm which fully covers an underlying display is thicker than the peripheral portion of the diaphragm to which the vibration generating part is mounted, the coil of the vibration generating part being coiled more laterally than vertically, and causing the diaphragm to vibrate by receiving magnetic flux lines, among the magnetic flux lines emitted from the magnet, that are diagonal or parallel with respect to the diaphragm.

2. The flat panel speaker unit as set forth in claim 1, wherein a step is formed at the boundary of the peripheral portion and the central portion of the diaphragm.

3. The fiat panel speaker unit as set forth in claim 1, wherein the central portion of the diaphragm is made thicker than the peripheral portion by attaching a reinforcing plate onto the central portion.

4. An electronic device comprising a flat panel speaker unit as set forth in claim 1.

* * * * *